United States Patent
Huang

(10) Patent No.: US 6,941,452 B2
(45) Date of Patent: Sep. 6, 2005

(54) DISPLAY SYSTEM AND METHOD FOR BIOS UPDATING

(75) Inventor: Grace Huang, Taipei (TW)

(73) Assignee: Inventec Corporation, Taipei (TW)

( * ) Notice: Subject to any disclaimer, the term of this patent is extended or adjusted under 35 U.S.C. 154(b) by 621 days.

(21) Appl. No.: 10/036,436

(22) Filed: Jan. 7, 2002

(65) Prior Publication Data

US 2003/0131224 A1 Jul. 10, 2003

(51) Int. Cl.[7] .......................................... G06F 15/177
(52) U.S. Cl. ............................................ 713/2; 713/100
(58) Field of Search ................................. 713/1, 2, 100

(56) References Cited

U.S. PATENT DOCUMENTS

| | | | | |
|---|---|---|---|---|
| 5,579,522 A | * | 11/1996 | Christeson et al. | ............ 713/2 |
| 5,805,882 A | * | 9/1998 | Cooper et al. | ................. 713/2 |
| 5,864,698 A | * | 1/1999 | Krau et al. | .................... 713/2 |
| 6,243,809 B1 | * | 6/2001 | Gibbons et al. | ............... 713/1 |
| 6,363,492 B1 | * | 3/2002 | James et al. | .................. 714/1 |
| 2003/0120907 A1 | * | 6/2003 | Tang | ............................. 713/1 |

* cited by examiner

*Primary Examiner*—Dennis M. Butler
(74) *Attorney, Agent, or Firm*—Birch, Stewart, Kolasch & Birch, LLP

(57) ABSTRACT

A display system and method for BIOS updating. The object of the invention is to display on a plurality of LED devices the status of BIOS updating to prevent the system from freezing due to inappropriate instructions given by a user who is unaware of the BIOS updating progress.

15 Claims, 5 Drawing Sheets

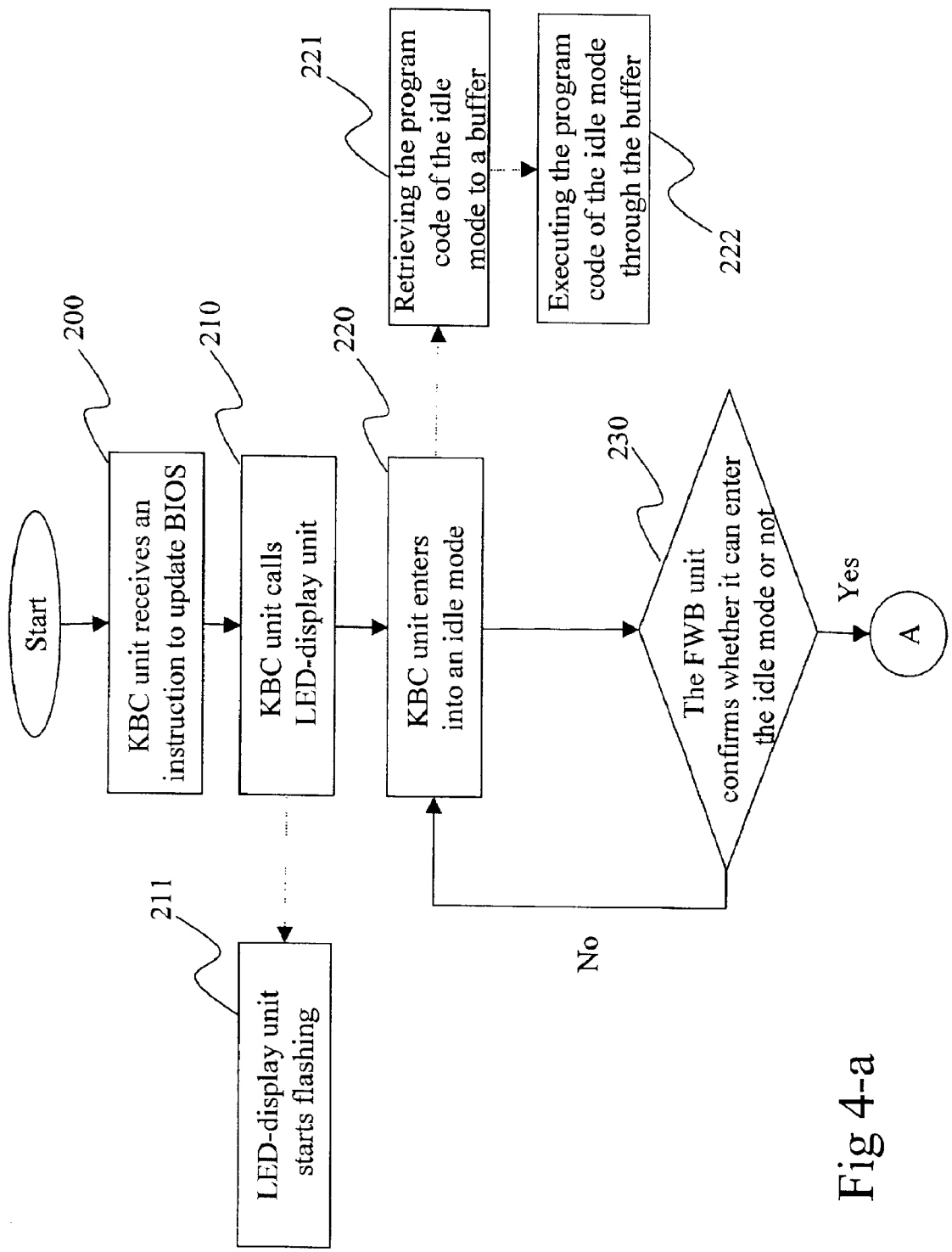
Fig 4-a

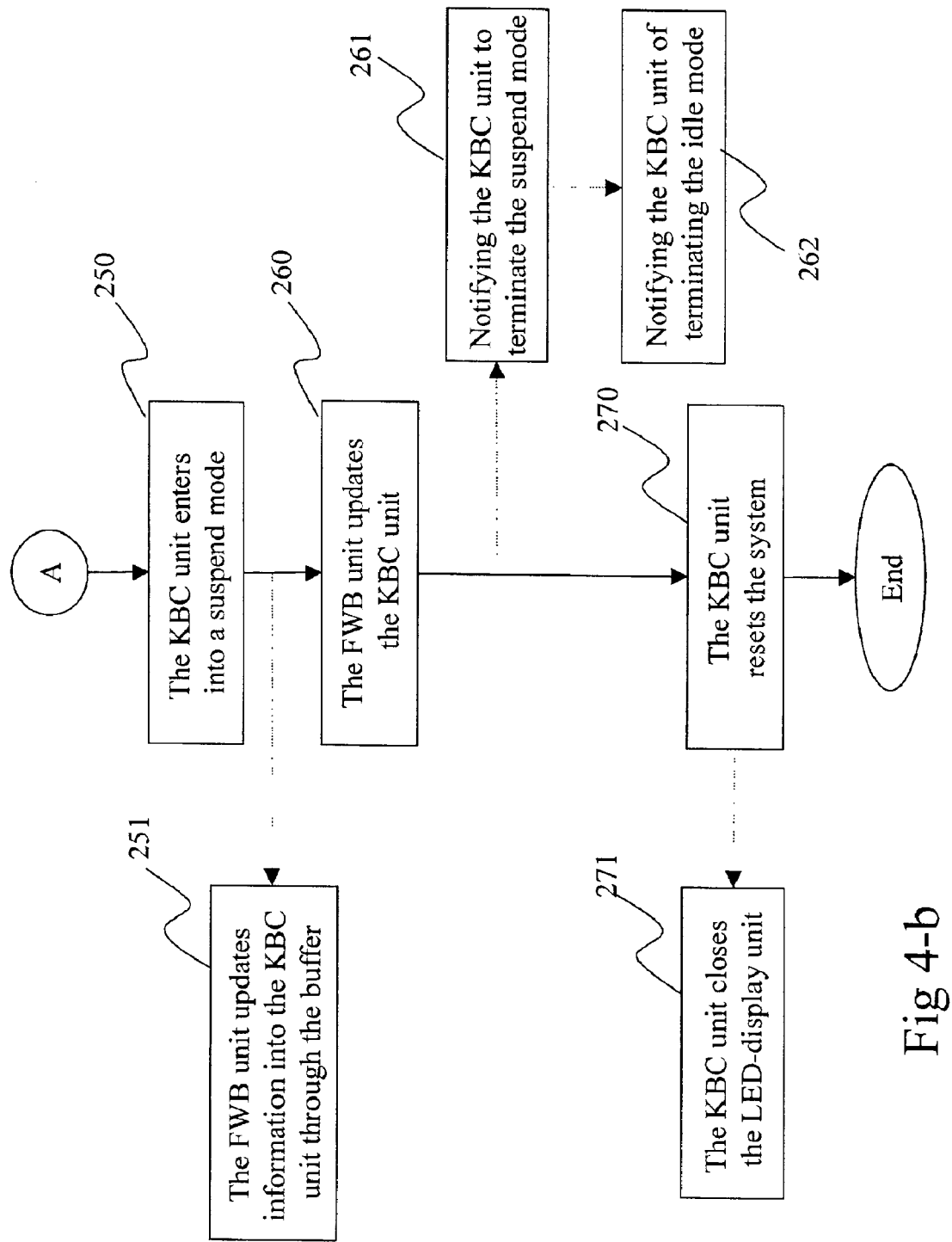
Fig 4-b

DISPLAY SYSTEM AND METHOD FOR BIOS UPDATING

FIELD OF THE INVENTION

The disclosed invention relates to a display function for updating a BIOS (Basic Input Output System). Particularly, it provides a plurality of LED (Light-Emitting Diode) devices to remind users while the BIOS is being updated. The system can automatically choose an output LED to achieve the function of the display system and method for BIOS updating.

RELATED ART

Generally, there are some management programs have to be initiated when a computer powers on. Those startup programs belong to the Basic Input/Output System (BIOS), for instance, the power-on self-test and lower-level setups for disk drives, the keyboard, monitor, etc. At the same time, the BIOS provides software support for controlling the connection of the computer and its peripheral devices.

A computer cannot normally operate under some circumstances when the BIOS is updated. Since the process of updating the BIOS is complicated and the BIOS will not necessarily be recorded successfully, it may be worse to update the BIOS through a new BIOS version when the current computer system already works smoothly. This would have a negative impact and lower the effectiveness of the computer to update the BIOS through a new BIOS version. Hence, prior to the BIOS firmware update, a computer manufacturer has the obligation to maintain or serve as a guarantor to process BIOS chips for a customer who is unable or unwilling to update the BIOS by him/herself. The customer can then send the BIOS chips (together with the motherboard) back to the original manufacturer for BIOS updating purposes.

There are some existing methods for updating the BIOS, such as updating through a floppy disc or CD-ROM, or downloading from a network. These kinds of updating must be operated on a stand-alone or followed by prior network downloading operations.

FIG. 1 is a schematic structure of commonly used computer systems. The CPU 10 connects with the NB 30 (north bridge, a set of chips) through the CPU Bus 20; the NB 30 connects not only with the RAM 40 (e.g. SDRAM, EDORAM, etc.), but also with the AGP VGA Card 60 through the AGP Bus 50. In addition, the NB 30 connects with the SB 80 (South bridge, a set of chips) through the PCI Bus 70 to transfer information and messages; the SB 80 connects not only with the HD (Hard disk) 90, USB (Universal Serial Bus) 100, and input devices (such as a mouse, keyboard, etc.) to access or input data, but also with the BIOS 130 and the Audio 140 respectively through the FWH interface 110 and the PCI Bus 120.

Not knowing when the BIOS is completely updated, a user or a system maintenance engineer often carelessly resets a computer or terminates the update execution to cause the problem of the computer system freezing. To avoid this problem, a display system and method for the BIOS update is applied.

SUMMARY AND PURPOSE OF THE INVENTION

In view of the foregoing, the invention provides a display system and method for BIOS updating. The disclosed system mainly comprises a CPU unit, a KBC unit, a FWH unit, and a LED unit. When a user updates the BIOS through the operations of the above-mentioned four units, LED flashes are able to remind the user of the BIOS updating execution. To avoid computer malfunction due to a user's carelessness, the LED flashes become normal when the BIOS update is completed.

The disclosed invention comprises at least the following steps. First, when a KBC receives a BIOS update instruction, it calls a LED-displaying unit. Then, an FWH unit provides information to the KBC unit through a buffer, and starts to update the KBC unit. Finally, the KBC unit resets the system.

The detailed embodiment and technique of the disclosed invention is further illustrated as follow.

BRIEF DESCRIPTION OF THE DRAWINGS

FIG. 4-a is a flowchart representation of the display system and method for updating the BIOS of the invention;

FIG. 4-b is a flowchart representation of the display system and method for updating the BIOS of the invention.

DETAILED DESCRIPTION OF THE INVENTION

Figure 2:
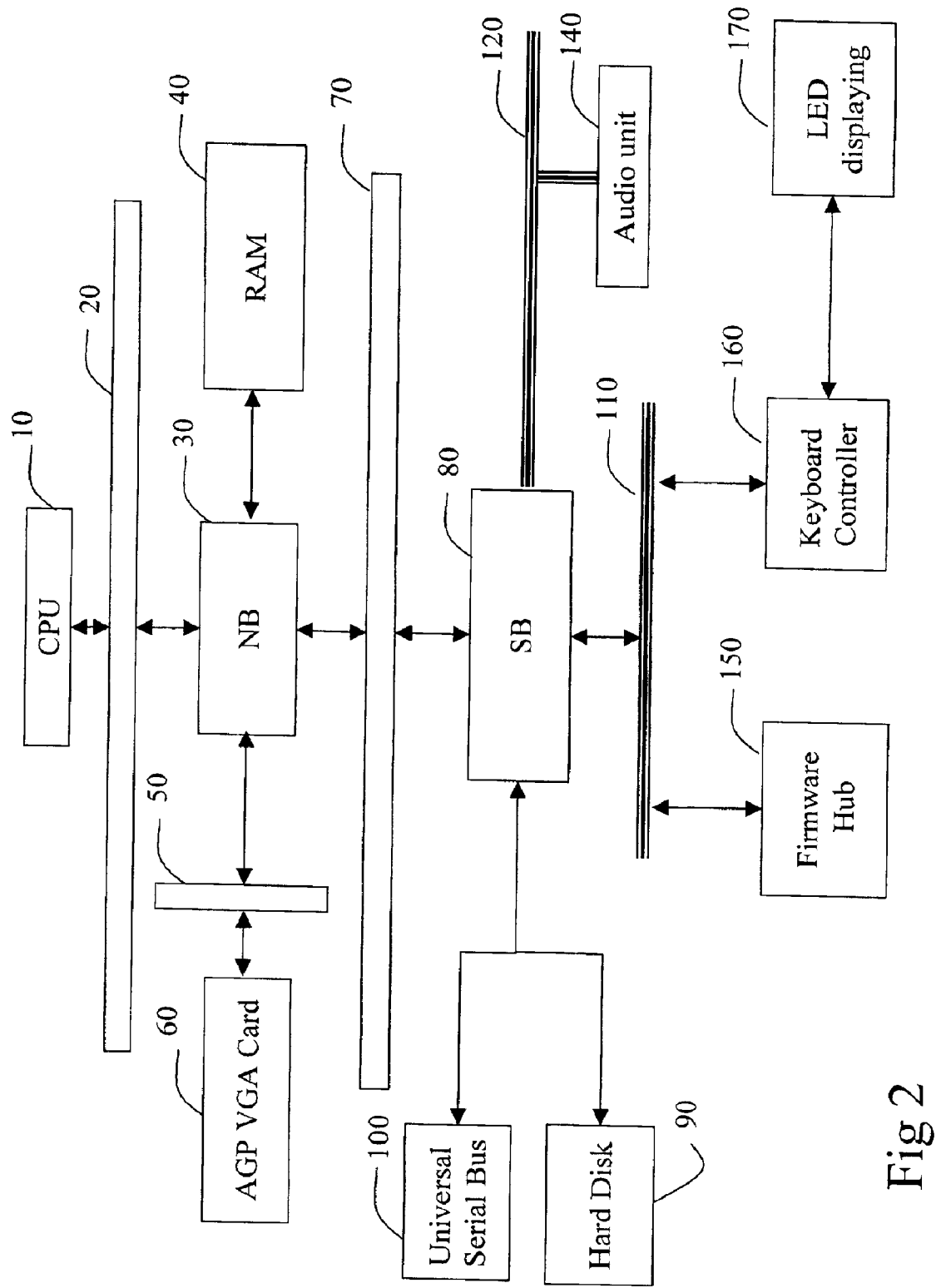
FIG. 2 is a systematic structure of displaying the BIOS update according to the invention.

The disclosed invention proposes a display system and method for updating the BIOS of a computer. FIG. 2 is a systematic structure of updating the BIOS. FIG. 2 illustrates the utilization of units to achieve the effect of reminding users. Details are provided as follows.

Figure 1:
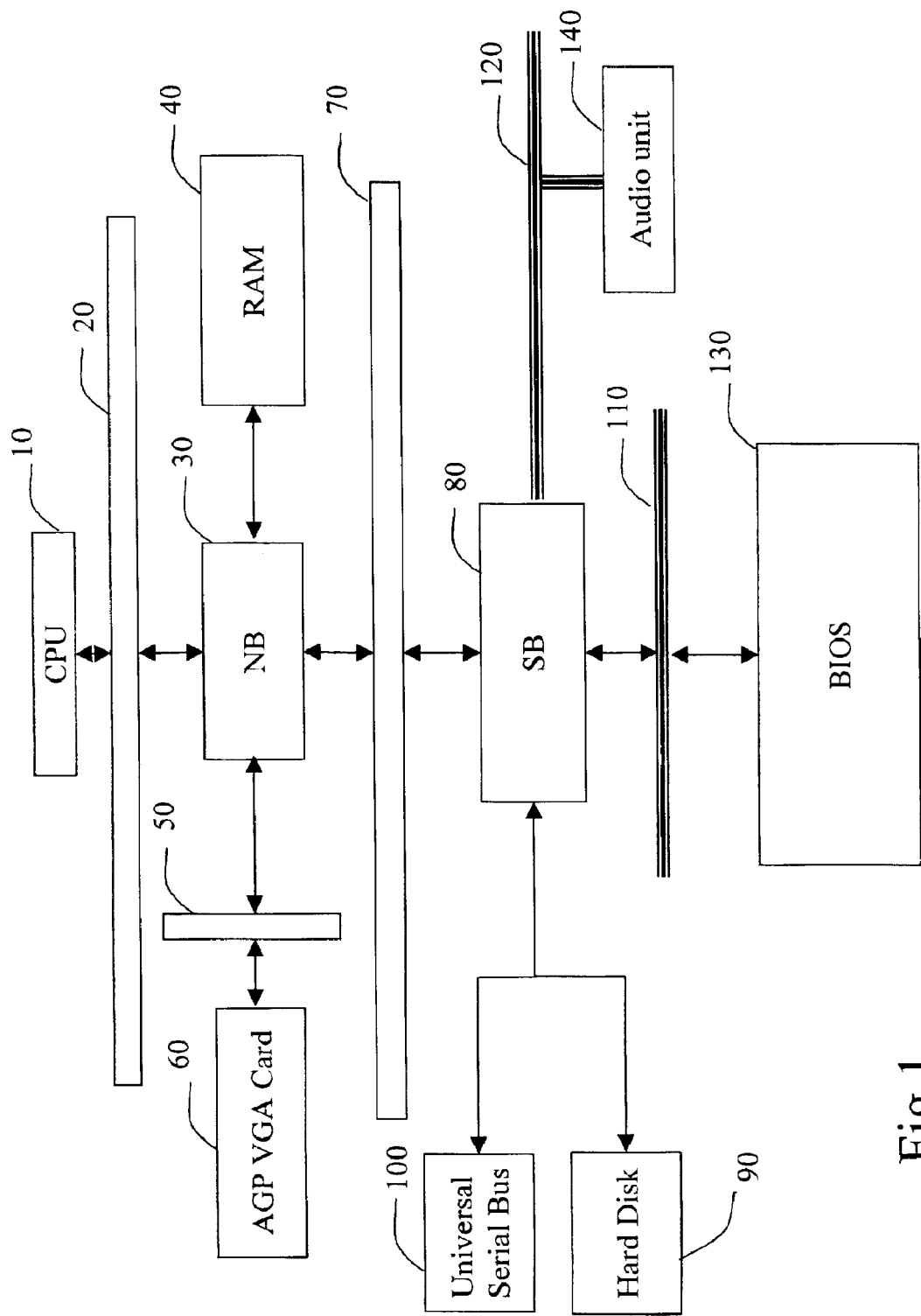
FIG. 1 is a schematic structure of presently known computer systems.

In addition to the components of the presently known BIOS unit 130, which is shown in FIG. 1, the disclosed invention further comprises an FWH unit 150, a KBC 160 unit, and a LED-display unit 170. The whole system is monitored by a CPU unit 10. The four units are detailed hereinafter.

The CPU unit 10 processes schedule allocations, arithmetic operations, logic operations and stores temporarily used information. When a computer starts to operate, the CPU unit 10 initiates a Power-On Self-Test (POST) and automatically detects the BIOS version. In the meantime, it monitors the processing of the BIOS update to avoid serious system problems such as being unable to boot or losing routes.

The FWH unit 150 controls the BIOS update and comparison. When the FWH unit 150 receives a message of updating the BIOS, it retrieves the latest version of the program code of the unit to transfer to the KBC unit 160. Firmware, in-between software and hardware, i.e., a computer hardware that comprises of program codes to record/burn software on the hardware. The program is burnt on the ROM of the motherboard and is modified through a ROM read-write device. The flash BIOS programs of a motherboard and of a modem can be re-written through specific programs to change micro-programs in the firmware.

The KBC unit 160 stores data inputted by a keyboard to a buffer, and the data is transferred to the CPU unit 10 for further processing. When the KBC unit 160 receives a program code needed for comparison, the program code version of the unit processes comparison with that of the FWH unit 150. Then, the KBC unit 160 updates a new program code through a buffer provided by this unit. The buffer provides a storage space to store temporarily used information and program codes, e.g. an update program code or a new instruction. Moreover, this unit provides an idle mode and a suspend mode for updating program codes. The idle mode is to stop all the clocks of the KBC unit 160 without processing any operations. While the KBC unit 160 enters into the idle mode without processing any schedule, the suspend mode waits to pause the KBC unit 160 pulse to avoid any new instructions entering into this unit when the program code is being updated.

The LED-display unit 170 is to connect with various hardware devices of the computer system and display the condition of the hard disk operations. When the BIOS starts updating, this unit is able to regularly restart a plurality of LED devices.

Figure 3:
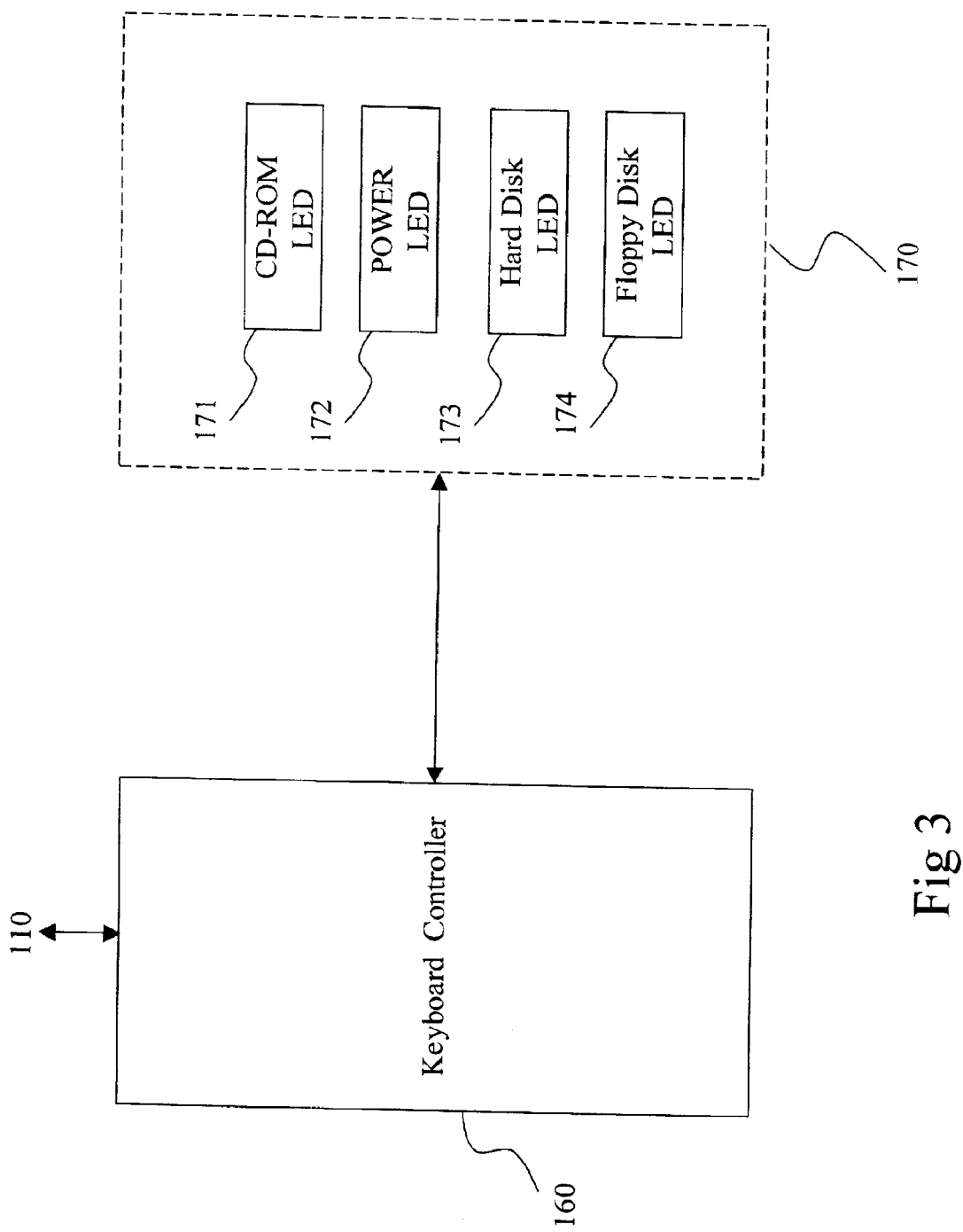
FIG. 3 is a detailed representation of the LED-displaying unit for updating the BIOS according to the invention.

FIG. 3 is a detailed representation of the LED-display unit for updating the BIOS according to the invention. The KBC unit 160 directly controls the LED-display unit 170. The LED-display unit 170 comprises at least a CD-ROM LED 171, a Power LED 172, a Hard Disc LED 173, and a Floppy Disc LED 174. The aforementioned four LED devices are crucial to a computer system. The disclosed invention is capable of providing Enable instructions to any LED display, prior to updating the BIOS through the KBC unit 160. For example, the CD-ROM LED 171 processes a flashing function corresponding to the Floppy Disc LED 174, or the Hard Disc LED 173. The Power LED 172 and the Floppy Disc LED 174 flash at the same time to ensure that the BIOS is completely updated for a user. The process of flashing is regular and cyclical to prevent a user from misunderstanding the meaning of the LED flashes. The user can easily understand the meaning of the LED flashing, as the BIOS update does not take too long.

FIG. 4-a is a flowchart representation of the system and method of updating the BIOS according to the invention. First, the KBC unit 160 receives an instruction to update the BIOS (Step 200). The KBC unit 160 then calls the LED-display unit 170 (Step 210), which starts flashing (Step 211). The process of flashing is regular and cyclical to prevent the user from misinterpreting the flashing of the LED-display unit 170. When it starts flashing, the KBC unit 160 enters into an idle mode (Step 220) to stop all operations of the KBC unit 160, and retrieve the program code to a buffer (Step 221). This buffer is provided by the KBC unit 160. The buffer then executes the code of the idle mode (Step 222). At the same time, the FWH unit 150 confirms whether the KBC unit 160 has entered into the idle mode (Step 230). If not, it is unable to update the BIOS and the process returns to step 220. If yes, then it enters into process symbol A.

FIG. 4-b is a flowchart representation of the display system and method of updating the BIOS according to the invention. With the reference to FIG. 4-b, after entering into process symbol A, the KBC unit 160 enters into a suspend mode (Step 250) and the FWH unit 150 updates information into the KBC unit 160 through the buffer (Step 251). The FWH unit 150 then starts to update the program code of the KBC unit 160 (Step 260). When the updating is completed, the FWH unit 150 notifies the KBC unit 160 to terminate the suspend mode (Step 261), and then notifies the KBC unit 160 to terminate the idle mode (Step 262). The KBC unit 160 resets the system (Step 270), and at the same time closes the LED-display unit 170 (Step 271).

In-between step 211 and step 271, the LED-display unit 170 enables its LED flashing devices to remind users that BIOS updating is not finished. The system cannot operate until it is reset and the LED-display unit 170 is restored.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claim is:

1. A displaying system for updating BIOS, comprising:
   a CPU unit generating a detecting signal when receiving a POST;
   a FWH unit retrieving a latest code version of the FWH unit and producing a comparison signal, when receiving the detecting signal;
   a KBC unit including a buffer and generating an update message when receiving the comparison signal to compare the program code version of the unit; and
   a LED-displaying unit regularly restarting a plurality of LEDs, when receiving the update message.

2. The system of claim 1, wherein the buffer includes a storage space to store temporarily used information and program codes.

3. The system of claim 1, wherein the KBC unit connects with the LED-displaying unit, so that when the BIOS updates the code, the KBC starts the operation of the LED-displaying unit.

4. The system of claim 1, wherein the KBC unit provides an idle mode and a suspend mode.

5. The system of claim 4, wherein the idle mode stops all schedules of the KBC unit without managing any operations.

6. The system of claim 4, wherein the suspend mode stops pulse of the KBC unit after waiting for the KBC unit to enter into the idle mode without managing any schedule.

7. The system of claim 1, wherein the LED-displaying unit is selected from the group consisting of a CD-ROM LED, a Power LED, a Hard Disc LED and a Floppy Disc LED.

8. The system of claim 7, wherein an initial display of the LED-displaying unit precedes flashing.

9. A method for displaying by a LED-displaying unit during updating BIOS to avoid a system halt resulting from being carelessly powered off, the method comprising the steps of:
   receiving an instruction to a KBC unit for updating BIOS;
   calling the LED-displaying unit by said KBC unit;
   transmitting information to the KBC unit through a buffer by a FWH unit;
   updating the KBC unit from the FWH; and
   reseting the system by the KBC unit.

10. The method of claim 9, wherein the step of receiving an instruction to a KBC unit for updating BIOS, includes the step of comparing a code version of the FWH unit with a code version of the KBC unit through Power-On Self-Test (POST) of the BIOS.

11. The method of claim 9, wherein the step of calling the LED-displaying unit, includes the step of interrupting an initial situation of the LED-displaying unit and directly enabling the LED-displaying unit.

12. The method of claim 11, wherein the LED-displaying unit includes a plurality of LED devices selected from the group consisting of a CD-ROM LED, a Power LED, a Hard Disc LED and a Floppy Disc LED.

13. The method of claim 9, wherein the KBC unit includes the buffer.

14. The method of claim 9, wherein the step of transmitting information to the KBC unit through a buffer by the FWH unit further includes the steps of:

the KBC unit entering into an idle mode;

confirming the KBC unit staying in the idle mode by the FWH unit; and the KBC entering into a suspend mode.

15. The method of claim 9, wherein the step of resetting the system by the KBC unit further includes the steps of:

the KBC unit terminating the suspend mode;

the KBC unit terminating the idle mode; and restoring the initial situation of the LED-displaying unit.

* * * * *